United States Patent
Sakano et al.

(10) Patent No.: US 10,746,303 B2
(45) Date of Patent: Aug. 18, 2020

(54) SEAL DEVICE

(71) Applicant: NOK CORPORATION, Tokyo (JP)

(72) Inventors: Yuya Sakano, Fukushima (JP);
Shigeyuki Ono, Fukushima (JP);
Takumi Yamada, Fukushima (JP)

(73) Assignee: NOK CORPORATION, Tokyo (JP)

( * ) Notice: Subject to any disclaimer, the term of this patent is extended or adjusted under 35 U.S.C. 154(b) by 143 days.

(21) Appl. No.: 15/778,066

(22) PCT Filed: Nov. 25, 2016

(86) PCT No.: PCT/JP2016/084895
§ 371 (c)(1),
(2) Date: May 22, 2018

(87) PCT Pub. No.: WO2017/094597
PCT Pub. Date: Jun. 8, 2017

(65) Prior Publication Data
US 2018/0347702 A1   Dec. 6, 2018

(30) Foreign Application Priority Data

Nov. 30, 2015   (JP) .................................. 2015-233022
Dec. 9, 2015    (JP) .................................. 2015-239969

(51) Int. Cl.
*F16J 15/3244*   (2016.01)
*F16J 15/3232*   (2016.01)
(Continued)

(52) U.S. Cl.
CPC ....... *F16J 15/3244* (2013.01); *F16J 15/3232* (2013.01); *F16J 15/3284* (2013.01); *F16J 15/406* (2013.01)

(58) Field of Classification Search
CPC .... F16J 15/164; F16J 15/3244; F16J 15/3256; F16J 15/3264
See application file for complete search history.

(56) References Cited

U.S. PATENT DOCUMENTS 4,986,552 A * 1/1991 Anzue .................... F16J 15/164
                                                        277/348
7,806,412 B2 * 10/2010 Nakagawa ........... F16J 15/3256
                                                        277/552
(Continued)

FOREIGN PATENT DOCUMENTS

CN          2534429 Y      2/2003
CN          104718404 A    6/2015
(Continued)

OTHER PUBLICATIONS

Supplemental European Search Report received in Application No. 16870534.1, dated Oct. 2, 2018.
(Continued)

*Primary Examiner* — Nicholas L Foster
(74) *Attorney, Agent, or Firm* — Greenblum & Bernstein, P.L.C.

(57) ABSTRACT

To suppress static leakage in a seal device, a seal lip is configured for sliding contact with a seal flange that includes a thread groove exerting a fluid pumping action at a time of shaft rotation. The seal device prevents sealing fluid on the inner-machine side from leaking to the outer-machine side between a housing and a rotating shaft inserted into a shaft hole on the housing. The seal lip is attached to the inner periphery of the shaft hole and the seal flange is attached to the outer periphery of the rotating shaft. A sliding area in the seal flange in sliding contact with the seal lip is a flat surface with no thread grooves, and has an outer peripheral side area and an inner peripheral side area, which each have a thread groove exerting a fluid pumping action when the rotating shaft rotates.

2 Claims, 7 Drawing Sheets

(51) Int. Cl.
*F16J 15/3284* (2016.01)
*F16J 15/40* (2006.01)

(56) References Cited

U.S. PATENT DOCUMENTS

| | | | | |
|---|---|---|---|---|
| 8,714,562 | B2* | 5/2014 | Nakagawa | F16J 15/3256 |
| | | | | 277/552 |
| 9,618,117 | B2* | 4/2017 | Nakagawa | F16J 15/164 |
| 10,267,422 | B2* | 4/2019 | Yamaguchi | F16J 15/3204 |
| 10,352,450 | B2* | 7/2019 | Yamanaka | F16J 15/3264 |
| 10,371,260 | B2* | 8/2019 | Nakagawa | F16J 15/3204 |
| 2008/0029967 | A1* | 2/2008 | Nakagawa | F16J 15/164 |
| | | | | 277/349 |
| 2010/0314837 | A1* | 12/2010 | Nakagawa | F16J 15/164 |
| | | | | 277/361 |
| 2011/0006485 | A1* | 1/2011 | Nakagawa | F16J 15/164 |
| | | | | 277/549 |
| 2013/0087978 | A1* | 4/2013 | Nakagawa | F16J 15/164 |
| | | | | 277/349 |
| 2015/0276059 | A1 | 10/2015 | Nakagawa | |
| 2015/0285380 | A1 | 10/2015 | Nakagawa | |
| 2017/0114901 | A1 | 4/2017 | Yamanaka et al. | |
| 2018/0023707 | A1* | 1/2018 | Yamaguchi | F16J 15/3204 |
| | | | | 277/400 |
| 2018/0038485 | A1 | 2/2018 | Yamanaka et al. | |
| 2018/0038486 | A1 | 2/2018 | Yamanaka et al. | |
| 2018/0066757 | A1* | 3/2018 | Sakano | F16J 15/3204 |
| 2018/0372222 | A1* | 12/2018 | Nakagawa | F16J 15/3232 |
| 2019/0277403 | A1* | 9/2019 | Sakano | F16J 15/3204 |

FOREIGN PATENT DOCUMENTS

| | | |
|---|---|---|
| DE | 10334896 A1 | 3/2005 |
| EP | 2749796 | 12/2013 |
| EP | 2913566 | 9/2015 |
| JP | 2-113173 | 4/1990 |
| JP | 3-57563 | 3/1991 |
| JP | 7-208610 | 8/1995 |
| JP | 8-254213 | 10/1996 |
| JP | 2013-83185 | 5/2013 |
| JP | 2014-129837 | 7/2014 |
| JP | 2016-148386 A | 8/2016 |
| WO | 2015/190450 | 12/2015 |

OTHER PUBLICATIONS

International Search Report issued in of WIPO Patent Application No. PCT/JP2016/84895, dated Feb. 14, 2017.
European Official Action in Appl. No. 16 870 534.1, dated Mar. 13, 2019.

* cited by examiner

SEAL DEVICE

BACKGROUND OF THE INVENTION

Field of the Invention

The present invention relates to a seal device that suppresses the leakage of sealing fluid inside a machine, such as an automobile, general machinery, or industrial machinery, out of the machine. The seal device according to the present invention is used, for example, as an oil seal for rotation that seals in inner-machine oil in the automobile-related field.

Description of the Conventional Art

As shown in FIGS. 7(A) and 7(B), there is conventionally known a seal device 101 that seals so as to prevent sealing fluid on the inner-machine side A from leaking to the outer-machine side B between a housing 51 and a rotating shaft 61 that is inserted into a shaft hole 52 provided on the housing 51. The seal device 101 is composed of a combination of a slinger 111 and a lip seal member 121; the slinger 111 is attached to the outer periphery of the rotating shaft 61, and the lip seal member 121 is located on the outer-machine side B of the slinger 111 and is attached to the inner periphery of the shaft hole 52 of the housing 51.

The slinger 111 is made of rigid material such as metal, and integrally has a tubular portion 112 and a seal flange 113; the tubular portion 112 is fitted into an outer peripheral surface of the rotating shaft 61, and the seal flange 113 is provided in one end of the tubular portion 112. A thread groove 114, which exerts a fluid pumping action with a centrifugal force at the time of rotation, is provided on an outer-machine-side end face 113a of the seal flange 113.

On the other hand, the lip seal member 121 has an attachment ring 122 and a rubbery elastic body 123; the attachment ring 122 is fitted into an inner peripheral surface of the shaft hole 52 of the housing 51, and the rubbery elastic body 123 is deposited on the attachment ring 122. The lip seal member 121 is provided with a seal lip (an end face lip) 124 that comes in sliding contact with the outer-machine-side end face 113a of the seal flange 113 in the slinger 111 by the rubbery elastic body 123.

The seal device 101 having the above-described configuration seals in sealing fluid by the seal lip 124 coming in sliding contact with the outer-machine-side end face 113a of the seal flange 113, and also the thread groove 114 provided on the outer-machine-side end face 113a of the seal flange 113 exerts a fluid pumping action with a centrifugal force at the time of rotation and pushes back the sealing fluid to the inner-machine side A; therefore it is possible to exert a beneficial sealing effect.

PRIOR ART DOCUMENT

Patent Documents

Patent Document 1: Japanese Unexamined Utility Model Publication No. 3-57563
Patent Document 2: Japanese Unexamined Patent Publication No. 2-113173
Patent Document 3: Japanese Unexamined Patent Publication No. 2014-129837
Patent Document 4: Japanese Unexamined Patent Publication No. 2013-083185

SUMMARY OF THE INVENTION

Problem to be Solved by the Invention

However, further improvement of function in the following aspects is demanded of the above-described seal device 101.

That is, as described above, the above-described seal device 101 seals in sealing fluid by the seal lip 124 coming in sliding contact with the outer-machine-side end face 113a of the seal flange 113, and also the thread groove 114 provided on the outer-machine-side end face 113a of the seal flange 113 exerts a fluid pumping action with a centrifugal force at the time of rotation and pushes back the sealing fluid to the inner-machine side A; therefore it is possible to exert a beneficial sealing effect; however, in this configuration, the thread groove 114 is disposed so as to intersect with a lip end of the seal lip 124. Therefore, if the rotation of the rotating shaft 61 comes to a stop and the centrifugal force is eliminated, and along with this, it goes into a situation where the fluid pumping action of the thread groove 114 is not exerted, there is fear that the sealing fluid may run down the thread groove 114 and pass by the lip end of the seal lip 124 from its outer peripheral side to the inner peripheral side, and then leak to the outer-machine side B (so-called static leakage occurs).

In view of the above points, the present invention is for a seal device in which a seal lip is configured to come in sliding contact with a seal flange, and a thread groove, which exerts a fluid pumping action at the time of rotation, is provided on the seal flange, and an object of the invention is to provide a seal device capable of suppressing the occurrence of static leakage.

Means for Solving the Problem

To achieve the above-described object, the present invention adopts the following means.

The seal device according to the present invention is one that seals so as to prevent sealing fluid on the inner-machine side from leaking to the outer-machine side between a housing and a rotating shaft inserted into a shaft hole provided on the housing; in the seal device in which a seal lip attached to an inner periphery of the shaft hole of the housing is configured to come in sliding contact with a seal flange attached to an outer periphery of the rotating shaft, a sliding area in the seal flange that the seal lip comes in sliding contact with is provided as a flat surface with no thread grooves, and an outer peripheral side area located on the outer peripheral side of the sliding area and an inner peripheral side area located on the inner peripheral side of the sliding area are each provided with a thread groove that exerts a fluid pumping action when the rotating shaft is rotating (claim 1).

According to the seal device in the present invention, a thread groove is provided on the seal flange; however, this thread groove is not provided in the sliding area, and is provided only in the outer peripheral side area and the inner peripheral side area. Therefore, since no thread grooves are provided in the sliding area, no thread grooves intersect with a lip end of the seal lip; thus, there never arises a situation in which sealing fluid runs down a thread groove and passes from the outer peripheral side to the inner peripheral side of the lip end of the seal lip when the rotating shaft stops rotating. Accordingly, it is possible to suppress the occurrence of static leakage.

Furthermore, since the outer peripheral side area and the inner peripheral side area are provided with a thread groove, a fluid pumping action of the thread groove is exerted.

Moreover, since particularly not only the inner peripheral side area but also the outer peripheral side area is provided with a thread groove, this thread groove provided in the outer peripheral side area exerts a fluid pumping action at the time of rotation, thereby sealing fluid running down the seal flange does not easily come close to the sliding area, i.e., the seal lip. Therefore, it is possible to enhance the sealing property on sealing fluid as compared with a case where only the inner peripheral side area is provided with a thread groove and the outer peripheral side area is not provided with a thread groove.

The sliding area is an annular area having a predetermined radial width; in the present invention, this sliding area is not provided with a thread groove, thus the sliding area is a flat surface with no thread grooves. Therefore, in the present invention, a flat surface with no thread grooves is set as an annular area having a predetermined radial width.

Effect of the Invention

According to the present invention, it is possible to suppress the occurrence of static leakage in a seal device in which a seal lip is configured to come in sliding contact with a seal flange, and a thread groove, which exerts a fluid pumping action at the time of rotation, is provided on the seal flange.

BRIEF EXPLANATION OF THE DRAWINGS

FIG. 7A is a cross-sectional diagram of main parts of a seal device according to the conventional example, and FIG. 7B is an explanatory diagram of a thread groove included in the seal device.

DETAILED DESCRIPTION OF PREFERRED EMBODIMENTS

Subsequently, embodiments of the present invention are described with reference to the drawings.

First Embodiment

Figure 1:
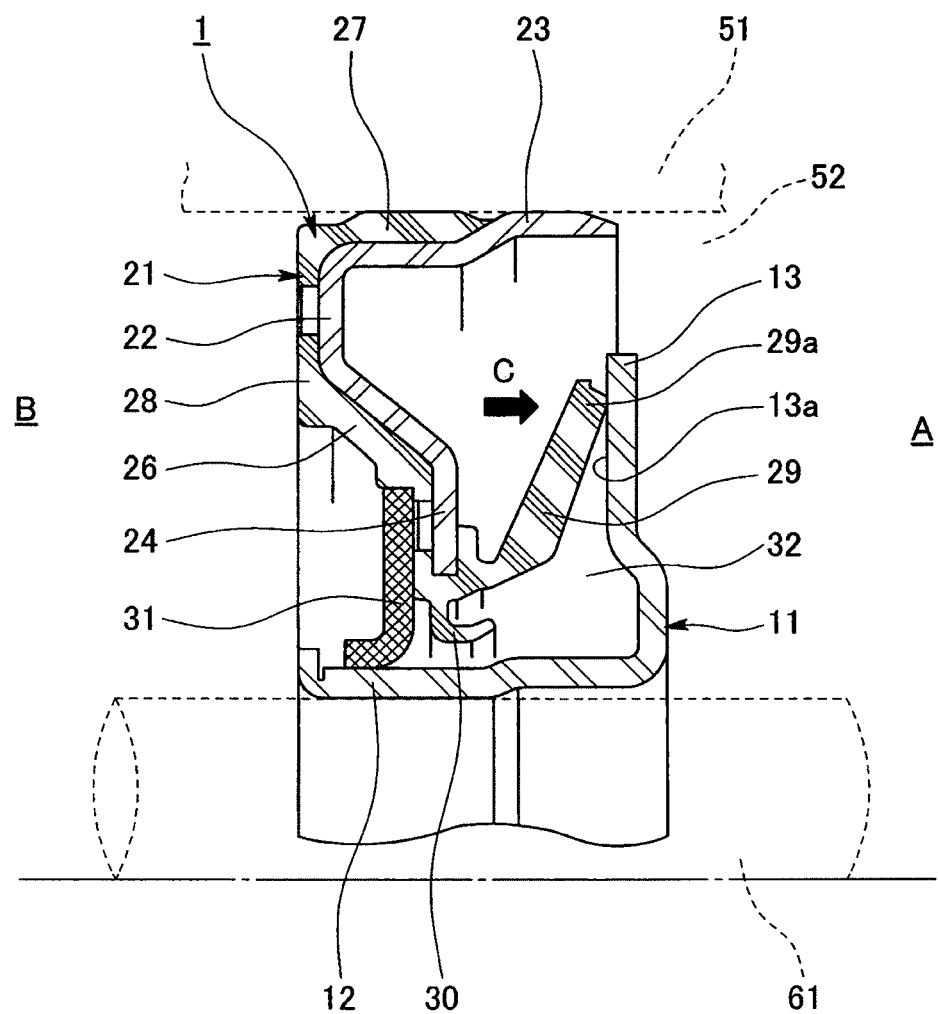
FIG. 1 is a cross-sectional diagram of main parts of a seal device according to a first embodiment of the present invention.
Figure 2:
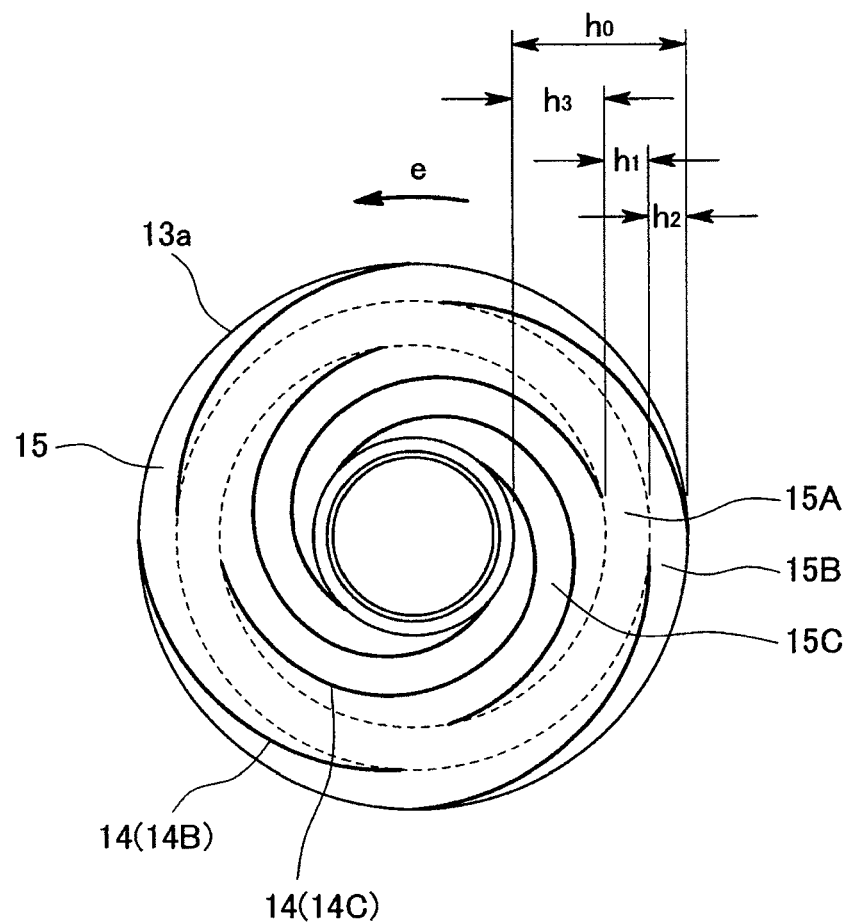
FIG. 2 is an explanatory diagram of a thread groove included in the seal device, viewed from a direction of an arrow C in FIG. 1.

FIGS. 1 and 2 show a seal device 1 according to an embodiment of the present invention.

The seal device 1 according to this embodiment is a seal device (for example, an oil seal for engine) that seals so as to prevent sealing fluid (such as oil) on the inner-machine side A from leaking to the outer-machine side B between a housing (a seal housing) 51 and a rotating shaft 61 that is inserted into a shaft hole 52 provided on the housing 51, and is composed of a combination of a slinger 11 and a lip seal member 21; the slinger 11 is attached to the outer periphery of the rotating shaft 61, and the lip seal member 21 is located on the outer-machine side B of the slinger 11 and is attached to the inner periphery of the shaft hole 52 of the housing 51.

The slinger 11 is made of rigid material such as metal, and integrally has a tubular portion (a sleeve portion) 12 and a seal flange (a flange portion) 13; the tubular portion 12 is fixed (fitted) to an outer peripheral surface of the rotating shaft 61, and the seal flange 13 radially faces outward and is provided in one end (an inner-machine-side end) of the tubular portion 12. As shown in FIG. 2, helical thread grooves 14 (14B and 14C), which exert a pumping action with a centrifugal force when the rotating shaft 61 is rotating, thereby exerting an action of pushing back sealing fluid to the outer peripheral side (the inner-machine side A), are provided on an outer-machine-side end face 13a of the seal flange 13. An arrow e indicates the rotating direction of the rotating shaft 61. Details of the outer-machine-side end face 13a of the seal flange 13 and the thread grooves 14 (14B and 14C) will be described later.

On the other hand, the lip seal member 21 has an attachment ring 22 made of rigid material such as metal and a rubbery elastic body 26; the attachment ring 22 is fixed (fitted) to an inner peripheral surface of the shaft hole 52 of the housing 51, and the rubbery elastic body 26 is deposited on the attachment ring 22 (by cure adhesion). An outer peripheral seal portion 27, an end face deposited portion 28, a seal lip (an end face lip) 29, and a grease retention lip 30 are integrally provided. The outer peripheral seal portion 27 is brought into contact with the inner peripheral surface of the shaft hole 52 of the housing 51 by the rubbery elastic body 26, thereby sealing between the housing 51 and the attachment ring 22. The end face deposited portion 28 is deposited on an end face portion of the attachment ring 22. The seal lip 29 comes in sliding contact with the outer-machine-side end face 13a of the seal flange 13 in the slinger 11. The grease retention lip 30 is in non-contact with the slinger 11. A lip end 29a of the seal lip 29 comes in sliding contact with the outer-machine-side end face 13a of the seal flange 13. A dust lip 31 is attached to a position on the inner peripheral side of the end face deposited portion 28. The dust lip 31 is made of fabric; alternatively, the dust lip 31 can be integral with the rubbery elastic body 26.

The attachment ring 22 integrally has an outer peripheral tubular portion 23 and a flange portion 24; the outer peripheral tubular portion 23 is fixed (fitted) to the inner peripheral surface of the shaft hole 52 of the housing 51, and the flange portion 24 radially faces inward and is provided in one end (an outer-machine-side end) of the outer peripheral tubular portion 23.

Furthermore, in this embodiment, particularly, the outer-machine-side end face 13a of the seal flange 13 and the thread grooves 14 are configured as below.

That is, as shown in FIG. 2, the seal flange 13 has a thread groove forming area 15 with the thread grooves 14 formed on the outer-machine-side end face 13a. The thread groove forming area 15 is an annular area having a predetermined radial width $h_0$. Furthermore, the thread groove forming area 15 is divided into a sliding area 15A that the seal lip 29 comes in sliding contact with, an outer peripheral side area 15B on the outer peripheral side of the sliding area 15A, and an inner peripheral side area 15C on the inner peripheral side of the sliding area 15A. The sliding area 15A is an annular area having a predetermined radial width $h_1$. The outer peripheral side area 15B is an annular area having a predetermined radial width $h_2$. The inner peripheral side area 15C is also an annular area having a predetermined radial width $h_3$.

The annular sliding area 15A having the predetermined radial width $h_1$ is not provided with a thread groove; thus, the sliding area 15A is a flat surface having no thread grooves. Therefore, here, a flat surface having no thread grooves is set as an annular area having the predetermined radial width $h_1$.

On the other hand, the outer peripheral side area 15B on the outer peripheral side of the sliding area 15A and the inner peripheral side area 15C on the inner peripheral side of the sliding area 15A are each provided with a thread groove 14; that is, the outer peripheral side area 15B is provided with a helical outer-peripheral-side thread groove 14B, and the inner peripheral side area 15C is likewise provided with a helical inner-peripheral-side thread groove 14C. The outer-peripheral-side thread groove 14B can be provided on an extension line of the inner-peripheral-side thread groove 14C.

In the seal device 1 having the above-described configuration, when the rotating shaft 61 is rotating, the lip end 29a of the seal lip 29 comes in sliding contact with the outer-machine-side end face 13a of the seal flange 13 in the slinger 11, thereby the seal lip 29 exerts the sealing function, and also, the slinger 11, which rotates along with the rotating shaft 61, exerts a fluid shaking-off action of the seal flange 13 and a fluid pumping action of the thread grooves 14; therefore, even if there is fluid passing between the seal lip 29 and the seal flange 13, the fluid can be pushed back to the outer peripheral side (the inner-machine side A), and thus, the beneficial sealing function is exerted.

Furthermore, when the rotation of the rotating shaft 61 comes to a stop, the centrifugal force is eliminated, and along with this, the above-described fluid shaking-off action and fluid pumping action come to a temporary stop; therefore, although there is fear that some sealing fluid may run down the thread grooves 14 and flow out from the inner-machine side A into an inner peripheral side space 32 of the seal lip 29, in the above-described seal device 1, the sliding area 15A is not provided with a thread groove, and the thread grooves 14 do not intersect with the lip end 29a of the seal lip 29. Therefore, there never arises a situation in which sealing fluid runs down the thread grooves 14 and passes from the outer peripheral side to the inner peripheral side of the lip end 29a of the seal lip 29 when the rotating shaft 61 is at a stop; thus, it is possible to suppress the occurrence of static leakage.

Moreover, as described above, the outer peripheral side area 15B and the inner peripheral side area 15C are provided with the outer-peripheral-side thread groove 14B and the inner-peripheral-side thread groove 14C, respectively; therefore, the fluid pumping action of these thread grooves 14B and 14C is exerted, and the sealing property is exerted.

Furthermore, in the seal device 1, particularly, not only the inner peripheral side area 15C but also the outer peripheral side area 15B is provided with a thread groove 14 (the outer-peripheral-side thread groove 14B); therefore, this thread groove 14 (the outer-peripheral-side thread groove 14B) exerts a fluid pumping action, thereby sealing fluid running down radially inward from an outer peripheral end of the outer-machine-side end face 13a of the seal flange 13 is pushed back radially outward. Accordingly, the sealing fluid does not easily reach the sliding area 15A; thus, it is possible to enhance the sealing effect of the seal lip 29.

Second Embodiment

Figure 3:
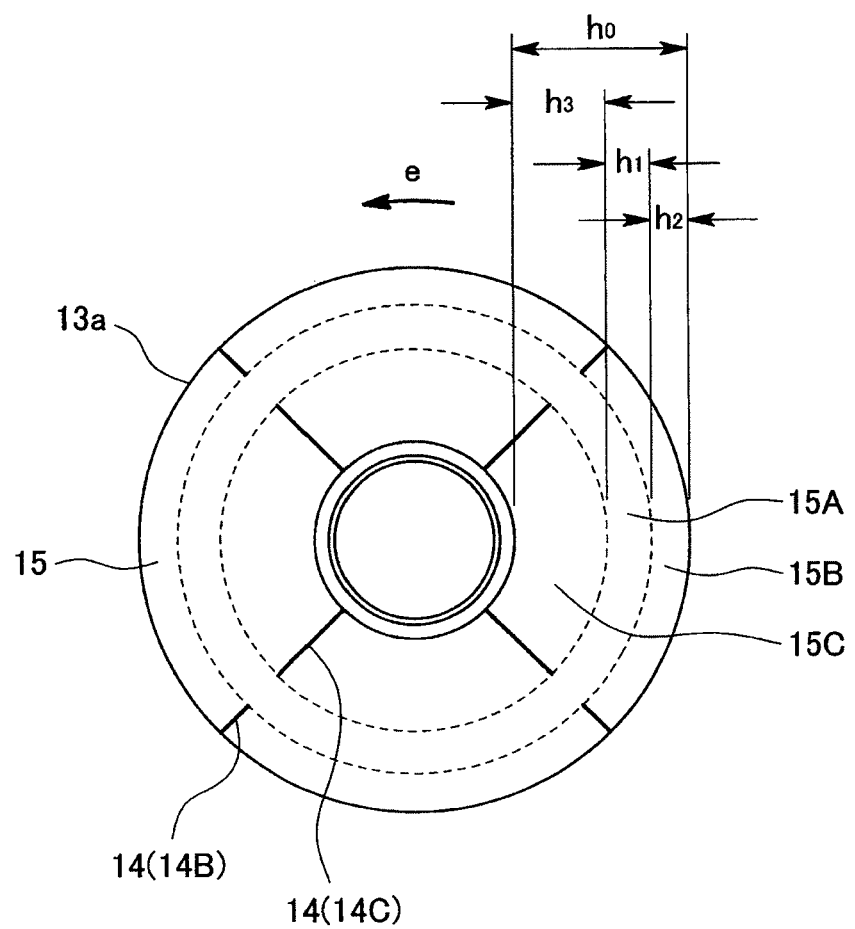
FIG. 3 is an explanatory diagram of a thread groove included in a seal device according to a second embodiment of the present invention.

Incidentally, in the above-described first embodiment, the planar shape of the thread grooves 14 (the outer-peripheral-side thread groove 14B and the inner-peripheral-side thread groove 14C) (viewed from a direction of an arrow C) is a curved shape; alternatively, the planar shape of the thread grooves 14 can be a linear shape. Furthermore, the thread grooves 14 (the outer-peripheral-side thread groove 14B and the inner-peripheral-side thread groove 14C) are not limited to be a helical fashion, and can be a radial fashion as shown in FIG. 3 as a second embodiment in which a plurality of (in the drawing, eight) grooves extending in a radial direction are provided.

Then, such radial thread grooves 14 (outer-peripheral-side thread grooves 14B and inner-peripheral-side thread grooves 14C) have a shorter groove length than the helical thread grooves 14 (the outer-peripheral-side thread groove 14B and the inner-peripheral-side thread groove 14C). Therefore, it is possible to reduce the time taken for sealing fluid (oil) flowing through the grooves to be discharged to the outer peripheral side of the seal flange 13 by the fluid pumping action, and therefore it is possible to enhance the sealing effect of the thread grooves (the outer-peripheral-side thread grooves 14B and the inner-peripheral-side thread grooves 14C).

Subsequently, the invention according to a reference example is described.

Problem to be Solved by the Invention

Figure 7A:
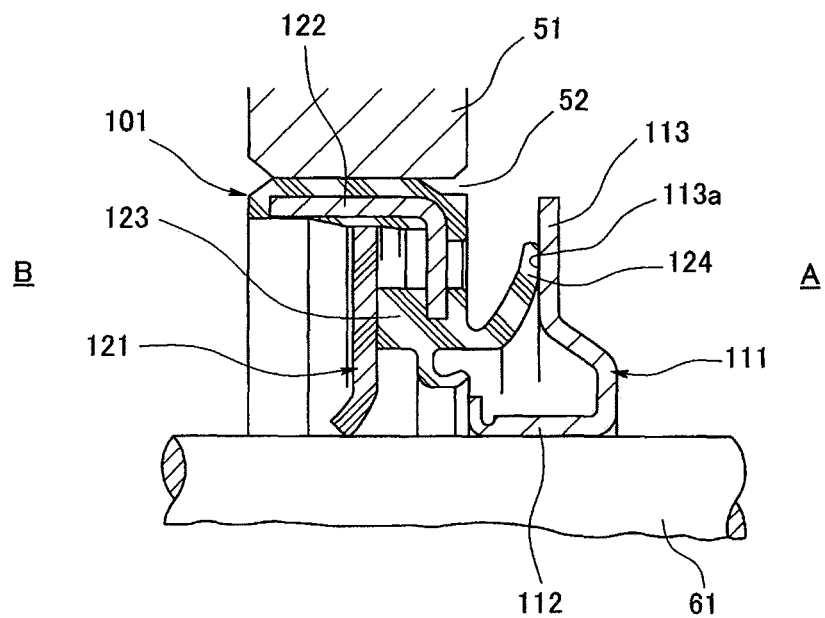
FIGS. 7A and 7B are diagrams showing a conventional example.

An aspect in which static leakage occurs in the seal device 101 in FIG. 7 according to the above-described conventional technology may involve the fluid level of sealing fluid retained in the shaft hole 52 of the housing 51 when the rotation of the rotating shaft 61 comes to a stop.

Figure 7B:
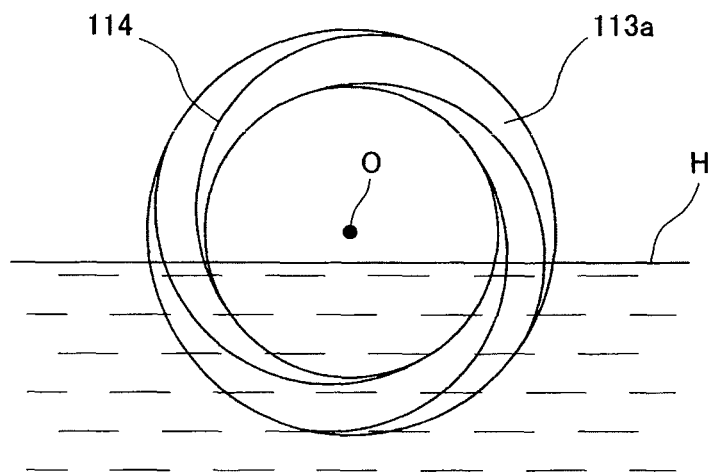

That is, on the assumption that the shaft hole 52 provided on the housing 51 and the rotating shaft 61 inserted into the shaft hole 52 of the housing 51 are disposed so that their central axis 0 (see FIG. 7(B)) faces in a horizontal direction or a substantially horizontal direction, when the rotating shaft 61 stops rotating, the fluid level H of sealing fluid retained in the shaft hole 52 of the housing 51 (see FIG. 7(B)) may be located at a level equal to the central axis 0 or at a level below the central axis 0. In this case, some portion on the circumference of the thread groove 114 provided on the whole circumference of the outer-machine-side end face 113a of the seal flange 113 is located below the fluid level H and is in a state of being immersed in the sealing fluid; thus, static leakage through the thread groove 114 occurs in the portion on the circumference of the thread groove 114.

Therefore, in the seal device 101 used under such circumstances, by taking measures to prevent the occurrence of static leakage in the portion on the circumference of the thread groove 114 located below the fluid level H, the occurrence of static leakage can be suppressed.

Furthermore, as another conventional technology associated with the present invention, there is a technology relating to a piston stop position control method for internal-combustion engine published in the above-described Patent Document 4.

This technology is that, in the piston stop position control method for internal-combustion engine, compressed air is introduced from an external device into a cylinder in an intake stroke just before it stops at a preset or calculated timing to bring a piston to a stop near the bottom dead center of a compression stroke that is the next stroke to the intake stroke. According to this technology, a rotating shaft (a crankshaft) always comes to a stop at a given rotational position (a specific portion on the circumference of the rotating shaft always comes to a stop at a 12 o'clock position (a top dead center position)).

In view of the above points, the invention according to the reference example is for a seal device in which a seal lip is configured to come in sliding contact with a seal flange, and a thread groove, which exerts a fluid pumping action at the time of rotation, is provided on the seal flange, and an object of the invention is to provide a seal device capable of suppressing the occurrence of static leakage. Furthermore, the invention is for a seal device used under circumstances in which the fluid level of sealing fluid is located at a level equal to the central axis or at a level below the central axis when the rotation of a rotating shaft whose central axis faces in a horizontal direction or a substantially horizontal direction comes to a stop, and an object of the invention is to provide a seal device capable of suppressing the occurrence of static leakage.

Means for Solving the Problem

To achieve the above-described object, the invention according to the reference example adopts the following means.

That is, the invention according to the reference example is a seal device that seals so as to prevent sealing fluid on the inner-machine side from leaking to the outer-machine side between a housing and a rotating shaft that is inserted into a shaft hole provided on the housing; in the seal device in which a seal lip attached to the inner periphery of the shaft hole of the housing is configured to come in sliding contact with a seal flange attached to the outer periphery of the rotating shaft, and a thread groove, which exerts a fluid pumping action when the rotating shaft is rotating, is provided on the seal flange so as to intersect with a lip end of the seal lip, the thread groove is provided in half or substantially half of an area on the circumference of the seal flange, and the other half or substantially half area on the circumference is a flat surface with no thread grooves.

According to the invention of this reference example, a thread groove is provided only in half or substantially half of an area on the circumference of the seal flange, and the other half or substantially half area on the circumference is a flat surface with no thread grooves. Therefore, the rotation of the rotating shaft is brought to a stop so that an area provided with the thread groove (a thread groove forming area) is located above the fluid level and a flat surface area with no thread grooves is located below the fluid level; thus, the thread groove is not in a state of being immersed in sealing fluid. Accordingly, it is possible to suppress the occurrence of static leakage through the thread groove.

Effect of the Invention

According to the invention of the reference example, in a seal device in which a seal lip is configured to come in sliding contact with a seal flange, and a thread groove, which exerts a fluid pumping action at the time of rotation, is provided on the seal flange, it is possible to suppress the occurrence of static leakage. Furthermore, in a seal device used under circumstances in which the fluid level of sealing fluid is located at a level equal to the central axis or at a level below the central axis when the rotation of a rotating shaft whose central axis faces in a horizontal direction or a substantially horizontal direction comes to a stop, it is possible to suppress the occurrence of static leakage.

DETAILED DESCRIPTION OF PREFERRED EMBODIMENT

Subsequently, an embodiment of the invention according to the reference example is described with reference to the drawings.

Figure 4:
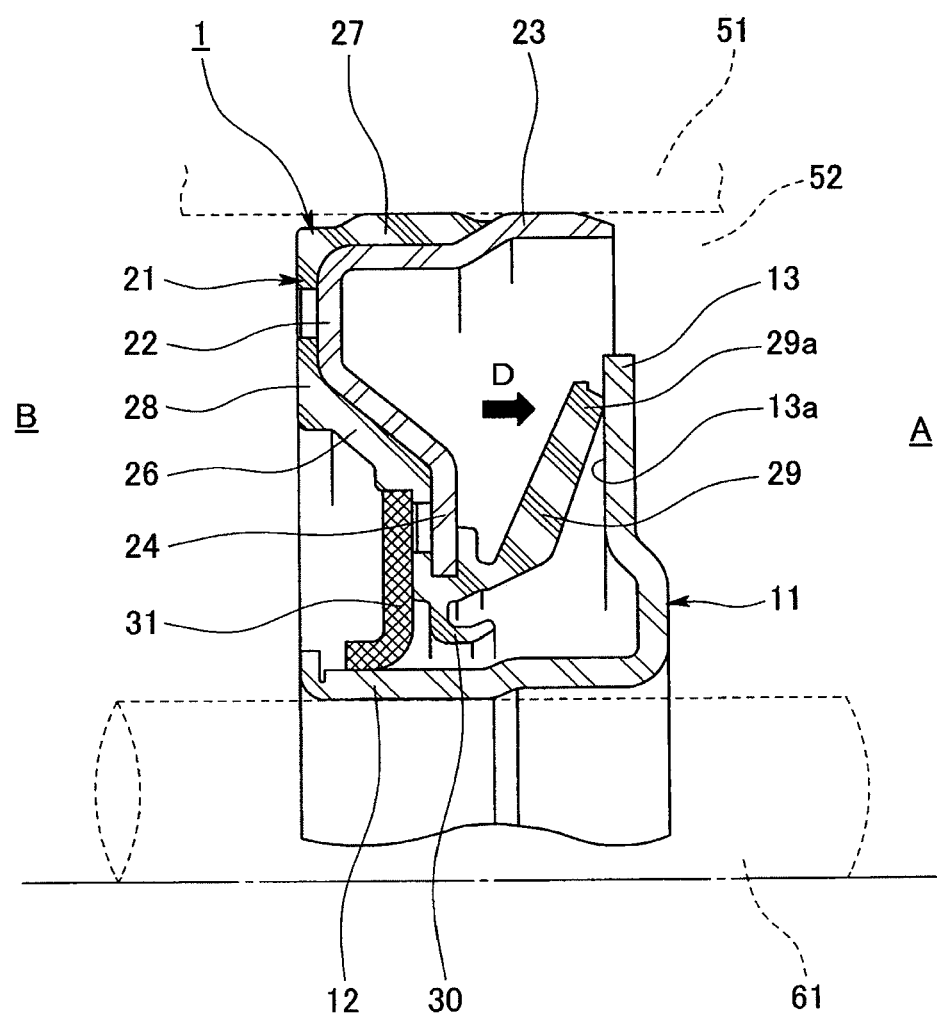
FIG. 4 is a cross-sectional diagram of main parts of a seal device according to a reference example.

FIG. 4 shows a seal device 1 according to the embodiment of the invention according to the reference example. The seal device 1 according to this embodiment is a seal device (for example, an oil seal for engine) that seals so as to prevent sealing fluid (such as oil) on the inner-machine side A from leaking to the outer-machine side B between the housing (a seal housing) 51 and the rotating shaft 61 that is inserted into the shaft hole 52 provided on the housing 51, and is composed of a combination of the slinger 11 and the lip seal member 21; the slinger 11 is attached to the outer periphery of the rotating shaft 61, and the lip seal member 21 is located on the outer-machine side B of the slinger 11 and is attached to the inner periphery of the shaft hole 52 of the housing 51.

Figure 5:
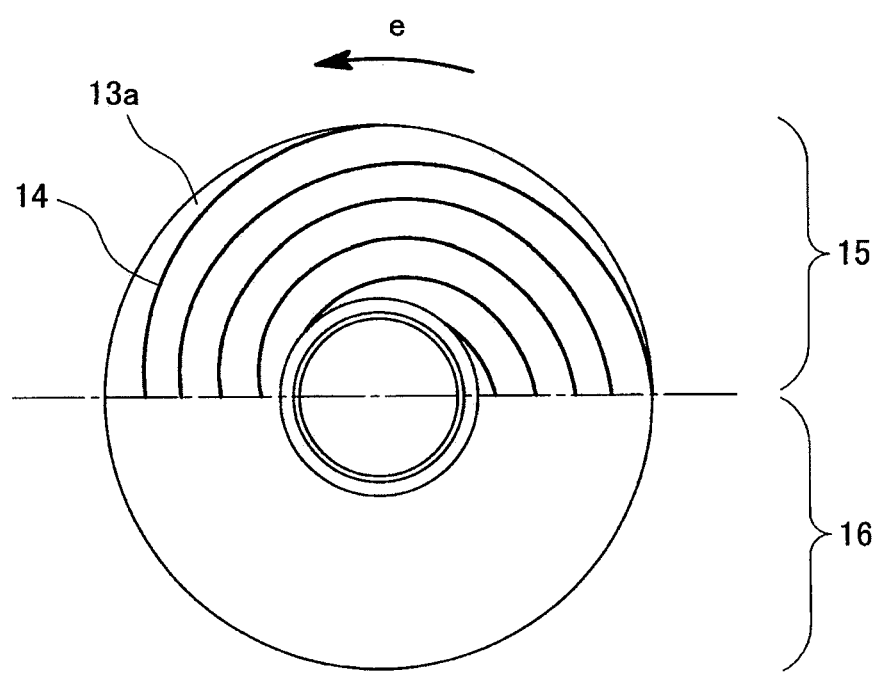
FIG. 5 is an explanatory diagram of a thread groove included in the seal device, viewed from a direction of an arrow D in FIG. 4.

The slinger 11 is made of rigid material such as metal, and integrally has the tubular portion (a sleeve portion) 12 and the seal flange (a flange portion) 13; the tubular portion 12 is fixed (fitted) to the outer peripheral surface of the rotating shaft 61, and the seal flange 13 radially faces outward and is provided in one end (an inner-machine-side end) of the tubular portion 12. As shown in FIG. 5, helical thread grooves 14, which exert a pumping action with a centrifugal force when the rotating shaft 61 is rotating, thereby exerting an action of pushing back sealing fluid to the outer peripheral side (the inner-machine side A), are provided on the outer-machine-side end face 13a of the seal flange 13. An arrow e indicates the rotating direction of the rotating shaft 61. Details of the outer-machine-side end face 13a of the seal flange 13 and the thread grooves 14 will be described later.

On the other hand, the lip seal member 21 has the attachment ring 22 made of rigid material such as metal and the rubbery elastic body 26; the attachment ring 22 is fixed (fitted) to the inner peripheral surface of the shaft hole 52 of the housing 51, and the rubbery elastic body 26 is deposited on the attachment ring 22 (by cure adhesion). The outer peripheral seal portion 27, the end face deposited portion 28, the seal lip (an end face lip) 29, and the grease retention lip 30 are integrally provided. The outer peripheral seal portion 27 is brought into contact with the inner peripheral surface of the shaft hole 52 of the housing 51 by the rubbery elastic body 26, thereby sealing between the housing 51 and the attachment ring 22. The end face deposited portion 28 is deposited on the end face portion of the attachment ring 22. The seal lip 29 comes in sliding contact with the outer-machine-side end face 13a of the seal flange 13 in the slinger 11. The grease retention lip 30 is in non-contact with the slinger 11. The lip end 29a of the seal lip 29 comes in sliding contact with the outer-machine-side end face 13a of the seal flange 13. The dust lip 31 is attached to a position on the inner peripheral side of the end face deposited portion 28. The dust lip 31 is made of fabric; alternatively, the dust lip 31 can be integral with the rubbery elastic body 26.

The attachment ring 22 integrally has the outer peripheral tubular portion 23 and the flange portion 24; the outer peripheral tubular portion 23 is fixed (fitted) to the inner peripheral surface of the shaft hole 52 of the housing 51, and the flange portion 24 radially faces inward and is provided in one end (an outer-machine-side end) of the outer peripheral tubular portion 23.

Furthermore, in this embodiment, particularly, the outer-machine-side end face 13a of the seal flange 13 and the thread grooves 14 are configured as below.

That is, as shown in FIG. 5, the thread grooves 14 are provided only in half (180 degrees) or substantially half (substantially 180 degrees) of an area on the circumference of the outer-machine-side end face 13a of the seal flange 13, and the other half (180-degree) or substantially half (substantially 180-degree) area on the circumference is a flat surface with no thread grooves. Therefore, the outer-machine-side end face 13a of the seal flange 13 is a combination of the thread groove forming area 15 with the thread grooves 14 formed and a non thread groove forming area 16 that is a flat surface with no thread grooves. The shape of the thread grooves 14 is a similar shape to those provided over the whole circumference of the outer-machine-side end face 13a of the seal flange 13; that is, the thread grooves 14 are designed in a form in which the thread grooves 14 are provided over the whole circumference, and, when they are manufactured, only the half circumference is threaded.

Figure 6:
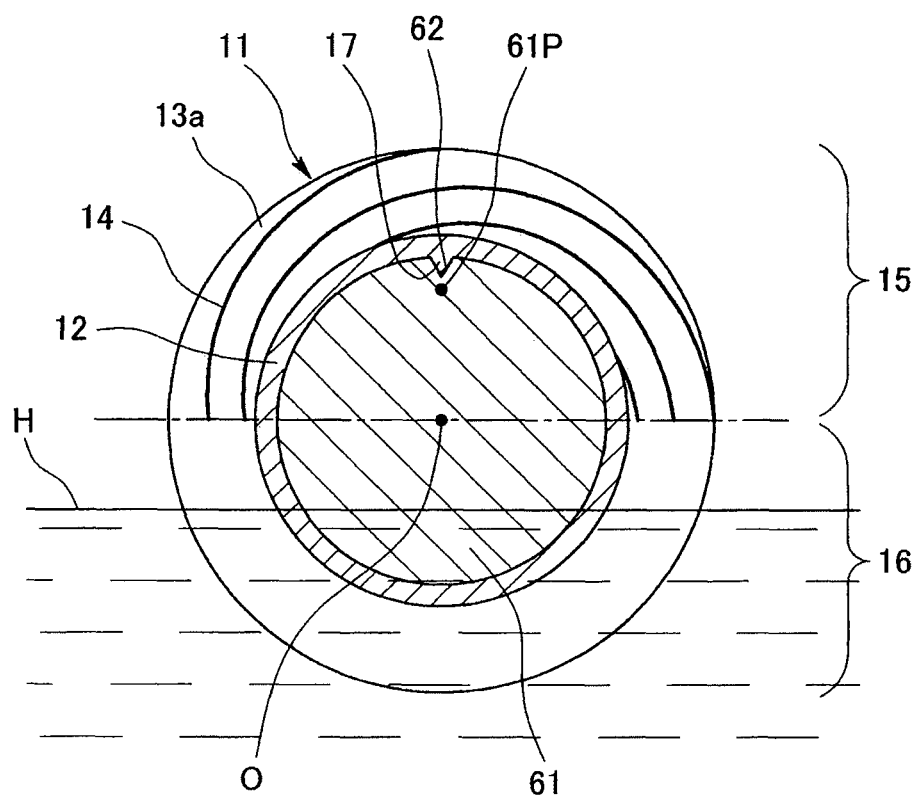
FIG. 6 is an explanatory diagram showing a relationship between a slinger and a rotating shaft that are included in the seal device and a relationship between the thread groove and the fluid level.

In the seal device 1 having the above-described configuration, the thread grooves 14 are provided only in half or substantially half of an area on the circumference of the outer-machine-side end face 13a of the seal flange 13, and the other half or substantially half area on the circumference is a flat surface with no thread grooves; therefore, as shown in FIG. 6, the rotation of the rotating shaft 61 is brought to a stop so that the thread groove forming area 15 is located above the fluid level H and the non thread groove forming area 16 is located below the fluid level H; thus, the thread grooves 14 are not in a state of being immersed in sealing fluid. Accordingly, it is possible to suppress the occurrence of static leakage through the thread grooves 14.

Incidentally, as shown in FIG. 6, the above-described seal device 1 is intended to be used under circumstances in which the fluid level H of sealing fluid is a position with a level equal to the central axis 0 or a position with a level below the central axis 0 when the rotation of the rotating shaft 61 whose central axis 0 faces in a horizontal direction or a substantially horizontal direction comes to a stop, and is further intended to be installed/used in a rotating machine having a structure in which the rotating shaft 61 always comes to a stop at a given rotational position (a specific portion 61P on the circumference of the rotating shaft 61 always comes to a stop at 12 o'clock position (a top dead center position)). Therefore, the slinger 11 is installed on the rotating shaft 61 so that the specific portion 61P on the circumference of the rotating shaft 61 is located in the central part on the circumference of the thread groove forming area 15. Thus, it is preferable to provide the slinger 11 with a means of determining the position on the circumference of the rotating shaft 61; in an example of FIG. 6, a positioning projection 17 is provided on the inner peripheral surface of the slinger 11, and the position on the circumference is determined by engaging the projection 17 with a positioning depressed portion 62 provided on the outer peripheral surface of the rotating shaft 61. The structure in which the rotating shaft 61 always comes to a stop at a given rotational position is realized by, for example, a technology in an internal-combustion engine piston stop position control method (a piston stop position control method for internal-combustion engine) in which compressed air is introduced from an external device into a cylinder in an intake stroke just before it stops at a preset or calculated timing to bring a piston to a stop near the bottom dead center of a compression stroke that is the next stroke to the intake stroke.

DESCRIPTION OF REFERENCE NUMERALS 1 seal device
11 slinger
12 tubular portion
13 seal flange
13a outer-machine-side end face
14 thread groove
14B outer-peripheral-side thread groove
14C inner-peripheral-side thread groove
15 thread groove forming area
15A sliding area
15B outer peripheral side area
15C inner peripheral side area
16 non thread groove forming area
17 positioning projection
21 lip seal member
22 attachment ring
23 outer peripheral tubular portion
24 flange portion
26 rubbery elastic body
27 outer peripheral seal portion
28 end face deposited portion
29 seal lip
29a lip end
30 grease retention lip
31 dust lip
32 inner peripheral side space
51 housing
52 shaft hole
61 rotating shaft
61P specific portion on the circumference of the rotating shaft
62 positioning depressed portion
A inner-machine side
B outer-machine side
0 central axis
H fluid level

What is claimed is:

1. A seal device placed between a housing and a rotating shaft inserted into a shaft hole provided in the housing, the seal device preventing sealing fluid on an inner-machine side from leaking to an outer-machine side, the seal device comprising:
    a lip seal member positioned in the shaft hole and attached to an inner periphery of the housing, the lip seal member comprising an attachment ring and a seal lip; and
    a slinger attached to an outer periphery of the rotating shaft, the slinger comprising a sleeve portion and a seal flange,
    wherein the seal lip comes into sliding contact with the seal flange of the slinger at a sliding area on the seal flange, the sliding area being a flat surface with no thread grooves,
    wherein the seal flange further comprises an outer peripheral side area located on an outer peripheral side of the sliding area and an inner peripheral side area located on an inner peripheral side of the sliding area, and wherein each of the outer peripheral side area and the inner peripheral side area have at least one thread groove that creates a fluid pumping action when the rotating shaft is rotating.

2. The seal device according to claim 1, wherein the flat surface is defined by an annular area having a predetermined radial width.

* * * * *